(12) United States Patent
Fukasawa

(10) Patent No.: US 6,951,186 B2
(45) Date of Patent: Oct. 4, 2005

(54) NON-INVASIVE ENVIRONMENT HISTORY INDICATOR FOR REUSABLE DEVICE

(75) Inventor: Motomu Fukasawa, Iruma (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/774,626

(22) Filed: Feb. 1, 2001

(65) Prior Publication Data

US 2002/0013678 A1 Jan. 31, 2002

(30) Foreign Application Priority Data

Feb. 8, 2000 (JP) .................................... 2000-030507

(51) Int. Cl.⁷ ............................................ G01D 21/00
(52) U.S. Cl. ...................... 116/200; 116/206; 116/208; 116/216
(58) Field of Search ................................ 116/200, 201, 116/202, 206, 207, 208, 216, 217; 356/215; 259/885, 888

(56) References Cited

U.S. PATENT DOCUMENTS

| | | | | | |
|---|---|---|---|---|---|
| 4,071,726 | A | * | 1/1978 | Werda ......................... | 116/202 |
| 4,074,742 | A | * | 2/1978 | Chamblin ................ | 152/154.2 |
| 4,103,539 | A | * | 8/1978 | Worley ........................ | 116/208 |
| 4,157,209 | A | * | 6/1979 | Amendolia .................. | 116/202 |
| 4,268,413 | A | * | 5/1981 | Dabisch ...................... | 116/216 |
| 4,355,910 | A | * | 10/1982 | Quick et al. ................ | 374/162 |
| 4,448,548 | A | * | 5/1984 | Foley ......................... | 374/160 |
| 4,743,557 | A | * | 5/1988 | Tiru et al. ................... | 116/207 |
| 4,850,716 | A | * | 7/1989 | Baker et al. ................ | 116/217 |
| 5,022,045 | A | * | 6/1991 | Elliott .......................... | 374/20 |
| 5,146,274 | A | * | 9/1992 | Hattori et al. .............. | 355/208 |
| 5,228,478 | A | * | 7/1993 | Kleisle ........................ | 116/208 |
| 5,272,504 | A | * | 12/1993 | Omura et al. ............... | 355/218 |
| 5,424,803 | A | * | 6/1995 | Noguchi ....................... | 355/53 |
| 5,468,961 | A | * | 11/1995 | Gradon et al. .............. | 250/343 |
| 5,673,028 | A | * | 9/1997 | Levy ........................... | 116/216 |
| 5,707,590 | A | * | 1/1998 | Thomas et al. ............. | 116/216 |
| 5,708,917 | A | * | 1/1998 | Kawai et al. ................ | 399/58 |
| 5,778,279 | A | * | 7/1998 | Kawai et al. ................ | 399/42 |
| 5,800,856 | A | * | 9/1998 | Hong Vuong ................ | 427/9 |
| 5,920,392 | A | * | 7/1999 | Tsai et al. ................... | 356/358 |
| 6,018,427 | A | * | 1/2000 | Gillette et al. .............. | 359/885 |
| 6,071,353 | A | * | 6/2000 | Gallagher .................... | 134/2 |
| 6,106,661 | A | * | 8/2000 | Raeder et al. .......... | 156/345.12 |
| 6,112,036 | A | * | 8/2000 | Shinohara .................... | 399/24 |
| 6,255,659 | B1 | * | 7/2001 | Sandison ................ | 250/474.1 |
| 6,314,907 | B1 | * | 11/2001 | Harris et al. ................ | 116/206 |
| 6,394,023 | B1 | * | 5/2002 | Crocker ...................... | 116/208 |

FOREIGN PATENT DOCUMENTS

| | | | | | |
|---|---|---|---|---|---|
| JP | 358105047 | | * | 6/1983 | ................. 374/141 |
| JP | 63122780 | A | * | 5/1988 | ................. 116/207 |
| JP | 363142304 | A | * | 6/1988 | ................. 359/885 |
| JP | 363143503 | A | * | 6/1988 | ................. 359/885 |
| JP | 01174920 | A | * | 7/1989 | ................. 116/202 |
| JP | 11006809 | A | * | 1/1999 | ........... G01N/27/12 |

* cited by examiner

Primary Examiner—Christopher W. Fulton
Assistant Examiner—Travis Reis
(74) Attorney, Agent, or Firm—Fitzpatrick, Cella, Harper & Scinto

(57) ABSTRACT

In an apparatus including a unit which is recoverable and reusable after use, an environmental history indicator member having a property variable according to an environmental history of use of the apparatus and arranged not to participate in any functions of the apparatus during use of the apparatus is disposed inside the unit or adjacent to the unit. By checking the state of the environmental history indicator member when the unit is recovered from the apparatus after the end of service of the apparatus, a management system for reuse is arranged to easily and efficiently decide the unit to be reusable or no longer usable.

13 Claims, 1 Drawing Sheet

NON-INVASIVE ENVIRONMENT HISTORY INDICATOR FOR REUSABLE DEVICE

BACKGROUND OF THE INVENTION

1. Field of the Invention

The present invention relates to an apparatus including a reusable unit which is recoverable from the marketed products (apparatuses) for recycling, and to a management system adapted for quality control over the apparatus.

2. Description of Related Art

It has recently become desirous, to provide an effective use of resources and in consideration of the environment, to recover and reclaim marketed products (apparatuses) to reuse, at a certain rate, and materials used for the products.

Some of such products include a component unit which has a service life much longer than that of the product. In such a case, it not only mitigates an adverse effect on the environment but is also advantageous in terms of recycling efficiency to reuse the component unit in a state of retaining an added value for the product.

However, even if it is assured that such a unit having a long service life is reusable within a product (apparatus) after enduring service under severe environmental conditions, it is desirous but has been impossible to determine the severity of the service conditions the unit has undergone within the recovered product.

In other words, a product (apparatus) containing such a component unit therein might have been either used, for example, in a well air-conditioned environment or used all day long under the scorching heat of the sun, until the end of its service life. However, it has been hardly possible to simply examine the used component unit for latent deterioration in a nondestructive manner before it is recycled for reuse in another product after its previous service.

BRIEF SUMMARY OF THE INVENTION

In view of the above-stated problem, an object of the invention is to provide an apparatus including a unit which is recoverable and reusable after use, the apparatus comprising an environmental history indicator member disposed inside the unit or adjacent to the unit, the environmental history indicator member having a property variable according to an environmental history of use of the apparatus and being arranged not to participate in any functions of the apparatus during use of the apparatus.

Accordingly, when the apparatus is recovered after the end of service life thereof, the environmental history indicator member makes it possible to find what kinds of environment the unit has been used in, by measuring the deteriorated state of the property of the environmental history indicator member, i.e., finding how the property has deteriorated, with an inspection device or the like. Therefore, the unit can be decided to be reused or to be not reused (for example, sending the unit to a material based classifying recycling process) based on more complete information. Thus, the environmental history indicator member permits a management system to be simply and efficiently arranged for recovering and reusing the unit contained in the apparatus.

The above and other objects and features of the invention will become apparent from the following detailed description of a preferred embodiment thereof taken in connection with the accompanying drawings.

DETAILED DESCRIPTION OF THE INVENTION

Hereinafter, a preferred embodiment of the invention will be described in detail with reference to the drawings.

Figure 1:
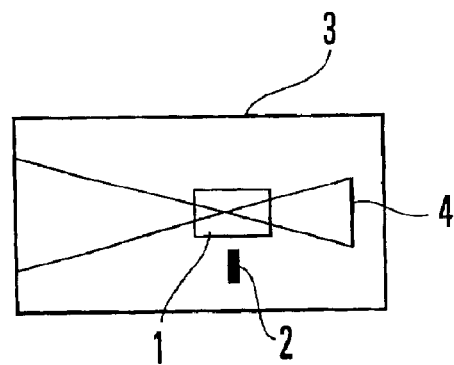
FIG. 1 is a diagram showing in outline the arrangement of an image reading apparatus, in a state obtained at the time of shipment thereof, according to an embodiment of the invention.

FIG. 1 is a diagram showing in outline the arrangement of an image reading apparatus, in a state obtained at the time of shipment thereof, according to the embodiment of the invention. In FIG. 1, reference numeral 3 denotes a body of the image reading apparatus. Inside the apparatus body 3, there is mounted a lens unit 1 forming an optical system for reading images. The lens unit 1 is arranged to be driven relative to an object of reading in the direction of scanning or sub-scanning by a driving mechanism (not shown) mounted inside the apparatus body 3. An image of the reading object is formed through the lens unit 1 on an image sensor 4, such as a CCD or the like, which photoelectrically converts the image into an image signal. The image signal thus obtained at the image sensor 4 is stored into a memory (not shown) or the like.

Here, the lens unit 1 excels in durability against a high-temperature and high-humidity environment, as compared with the above driving mechanism, the image sensor 4, etc. Therefore, the individual service life of the lens unit 1 is longer than the service life of the whole image reading apparatus. Further, the lens unit 1 has a high added value. The lens unit 1 is one of such units that are ideal for reuse by recovering them from the image reading apparatus after the end of the service life of the image reading apparatus.

Therefore, in the case of the present embodiment, in the vicinity of the lens unit 1 inside the apparatus body 3, there is detachably mounted, on the apparatus body 3, an environmental history indicator member 2 which does not participate directly in the image reading function of the image reading apparatus. Incidentally, the environmental history indicator member 2 may be disposed inside the lens unit 1.

A glass material to be used for the lens unit 1 is of such a property that causes a phenomenon called tarnish, in which some component substance of the material comes to precipitate on the surface of the material when the material has been left under a high temperature and a high humidity over a considerably long period of time.

In such a case, the service life of the lens unit to be reused is affected by the high-temperature and high-humidity environment. Therefore, the environmental history indicator member 2 is made of a very small material which is of such a property that deteriorates under a high temperature and a high humidity and permits detection of the degree of deterioration without difficulty.

More specifically, the environmental history indicator member 2 is made of a material selected from the group of materials including color glass which presents a cyanic color and contains a copper phosphate, an ND filter or a gelatin color filter which is relatively weak in a tarnishing environment, and optical glass which has a refractive index of 1.6 to 1.65 or thereabout and an Abbe number of 60 or thereabout.

Further, the deterioration resisting power of the environmental history indicator member 2 as against a high-temperature and high-humidity environment is preferably equal to or less than that of the lens unit 1 when they are left in the same environment.

Thus, in the present embodiment, the environmental history indicator member 2 is thus made of such a material that is usually not used in designing a unit and is arranged either singly or in a stepwise manner.

Figure 2:
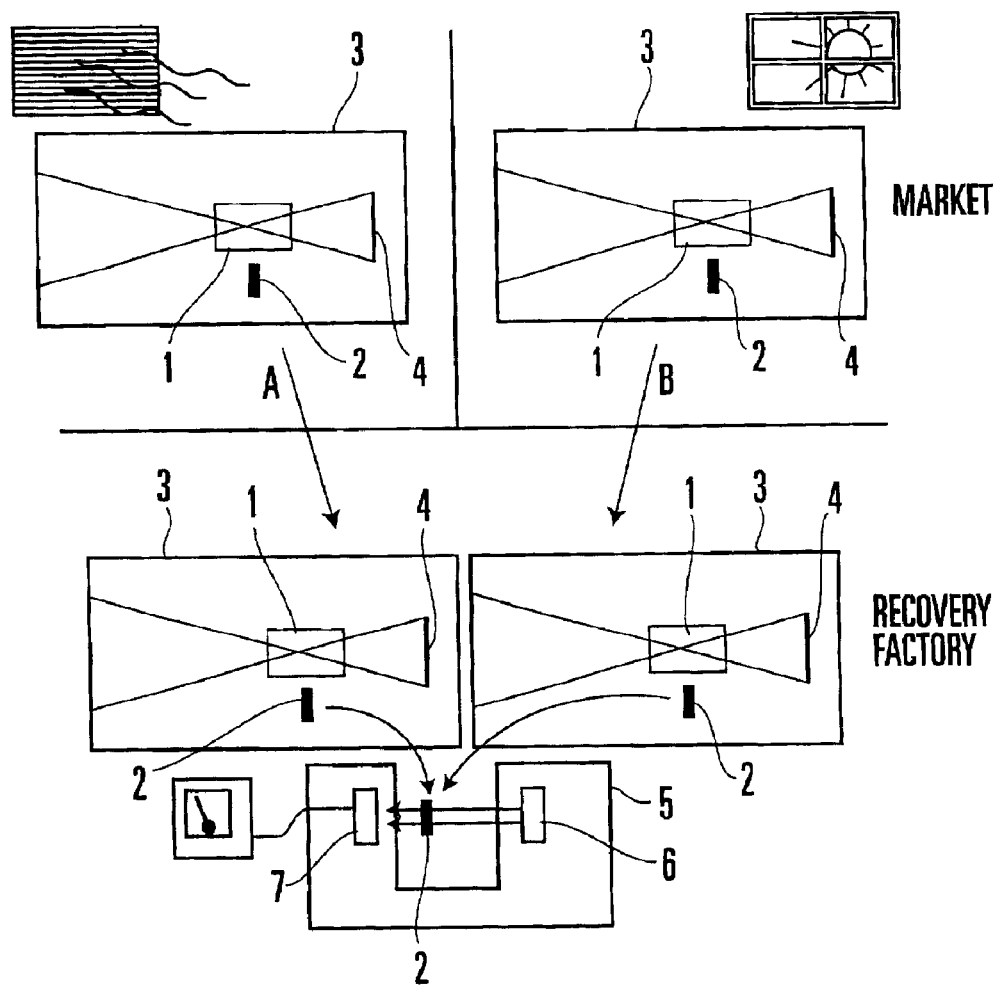
FIG. 2 is a schematic diagram for explaining different environmental histories of the same image reading apparatus and the arrangement of a recovering and reusing management system according to the embodiment of the invention.

FIG. 2 schematically shows a recovering and reusing management system for the image reading apparatus arranged as described above.

Referring to FIG. 2, an environment A represents a case where the image reading apparatus has been used always at a well air-conditioned office. Another environment B represents a case where the image reading apparatus has been used at an office without air conditioning in the daytime in a tropical region.

When these image reading apparatuses which have been used in such different environments are recovered and sent to a recovery factory, both of the lens units 1 mounted on the recovered apparatuses satisfy a required rate of performance. However, the lens unit 1 of the apparatus which has been used in the environment B has a high rate of latent damage while that of the one used in the environment A shows no change from a state obtained before it was put in service.

In order to perform accurate quality control over such differences in damage rate, the environmental history indicator member 2, which has been formed beforehand in such a shape as to match with an inspection device 5, is removed from the body 3 of the recovered apparatus to examine, with the inspection device 5, any changes in the property of the environmental history indicator member 2.

In this instance, since a transmission factor of light transmitting property of the environmental history indicator member 2 has been lowered by a tarnished state thereof, the rate of damage can be easily judged from the level of a signal obtained by applying light from a light projector 6 to the environmental history indicator member 2 and receiving light through the environmental history indicator member 2 with a light receiver 7.

If the transmission factor of the environmental history indicator member 2 is found by the inspection device 5 to be considerably larger than a predetermined value which suggests a tarnished state of the lens unit 1, the lens unit 1 is judged to remain sufficiently undamaged to be reused as it is for a new product of the image reading apparatus. With the lens unit 1 thus reused, the same environmental history indicator member 2 which has been subjected to the transmission factor measuring inspection is also mounted on the new apparatus together with the lens unit 1.

If the transmission factor of the environmental history indicator member 2 is found to be close to the above-stated predetermined value, the lens unit 1 is overhauled and cleansed and is then reassembled to be reused for a new product of the image reading apparatus. With the lens unit 1 thus reused, the same environmental history indicator member 2 which has been subjected to the transmission factor measuring inspection is also mounted on the new apparatus together with the lens unit 1.

Further, if the transmission factor of the environmental history indicator member 2 is found to be considerably smaller than the above-stated predetermined value, for example, due to the fact that the lens unit 1 has been recovered and reused a number of times, the lens unit 1 is considered to have been so damaged that it is no longer reusable. In such a case, the lens unit 1 is disassembled and sent to a recycling process arranged to be performed on the level of original state of materials.

According to the arrangement of the embodiment of the invention described above, a deteriorated state of property of the environmental history indicator member 2 is measured by means of the inspection device 5. By this inspection method, it is possible to find in what kind of environment the lens unit 1 has been used within the recovered apparatus. A decision then can be accurately made as to whether or not the lens unit 1 can be reused. Therefore, a recovering and reusing management system for the lens unit 1 can be simply and efficiently arranged.

In the case of the embodiment described above, the invention is applied to a recovering and reusing management system for a lens unit mounted on an image reading apparatus. However, the invention is applicable also to a recovering and reusing management system for other apparatuses having lens units, such as a photo printer, a video camera, etc.

Further, while the invention is applied for the reuse of a lens unit, the object unit for reuse may be other than the lens unit.

For example, in a case where the object unit for reuse is made of an elastic material, a low-temperature and dry environment tends to deteriorate the material. In such a case, a natural rubber material the elasticity of which is more apt to deteriorate than that of the object unit for reuse is arranged to be used as the environmental history indicator member and to be subjected to a stress test of an inspection process in accordance with the invention.

In a case where the object unit for reuse is made of a metal, a material which is more readily oxidized and rusted than the object unit for reuse is used as the environmental history indicator member according to the invention. More specifically, an efflorescent material is used for the environmental history indicator member in a case where the object unit for reuse is vulnerable only to a low moisture environment. A deliquescent material is used for the environmental history indicator member in a case where the object unit for use is vulnerable only to a high moisture environment.

Further, in a case where the service life of the object unit for reuse tends to be affected by an exposure to ultraviolet radiation of sunlight or the like, a pigment which is apt to be caused to fade by ultraviolet rays may be used for making the environmental history indicator member. In a case where there are a plurality of service life determining factors, a plurality of environmental history indicator members are selected and used according to the kinds of such environmental factors.

According to the invention, as described above, an enviromental history indicator member which does not participate in the functions of the apparatus and has such a property that varies or deteriorates according to the environmental history of service of the apparatus is used and the state of deterioration in property of the environmental history indicator member is measured with an inspection device. Accordingly, it is possible to find what kind of environment the unit has undergone so far inside the recovered apparatus. Thus, the unit can be accurately decided to be reusable or to be no longer reusable. A recovering and reusing management system, therefore, can be simply and efficiently arranged for recovering and reuse of the unit.

What is claimed is:

1. An apparatus comprising:
   a recoverable and reusable unit performing a function independent of determining the degree of deterioration of said recoverable and reusable unit, which is recoverable and reusable after use of said unit and said apparatus in an environment, depending on the degree of deterioration of said unit due to the environment in which said apparatus is used, wherein said recoverable and reusable unit is an optical member; and deterioration indicator means for determining the degree of deterioration of said recoverable and reusable unit before said unit is reconditioned for reuse by permitting a determination of the degree of deterioration thereof, said deterioration indicator means being disposed inside said apparatus, the deterioration-resisting power of said deterioration indicator means that deteriorates over time due to the environment in which said apparatus is used being less than or equal to the deterioration-resisting power of said recoverable and reusable unit, said deterioration indicator means being arranged so as not to participate in any functions of said apparatus during use of said apparatus, and said deterioration indicator means having a property which is a measure of the deterioration of said deterioration indicator means due to the temperature and/or humidity of the environment in which said apparatus is used.

2. An apparatus according to claim 1, wherein said deterioration indicator means is arranged to be mountable and dismountable on and from a body of said apparatus either singly or together with said unit and is formed in such a shape as to enable an inspection device to measure a property of said deterioration indicator means representing the deterioration of said deterioration indicator means in a state of being dismounted from the body of said apparatus.

3. An apparatus including a unit which is recoverable and reusable after use, said apparatus comprising:

an environmental history indicator member disposed inside said apparatus, said environmental history indicator member having a property variable according to an environmental history of use of said apparatus and being arranged so as not to participate in any functions of said apparatus during use of said apparatus, wherein said unit includes an optical member, and said environmental history indicator member has a property which varies according to an environmental history with respect to temperature and/or humidity, wherein said environmental history indicator member is an optical filter having a light transmitting property which varies according to an environmental history with respect to temperature and/or humidity.

4. An apparatus according to claim 3, wherein the property of said environmental history indicator member deteriorates over time and wherein said environmental history indicator member maintains the state of deterioration of the property.

5. An apparatus according to claim 3, wherein said optical filter as said environmental history indicator member is composed of an ND filter, copper phosphate glass, gelatin or optical glass having a refractive index of substantially 1.6 to 1.65 and an Abbe number of substantially 60.

6. An apparatus including a lens unit which is recoverable and reusable after use, said apparatus further comprising:

deterioration indicator means for indicating the degree of deterioration of said lens unit before said lens unit is reconditioned for reuse due to the environment in which said lens unit is used, said deterioration indicator means being disposed inside said apparatus, the deterioration-resisting power of said deterioration indicator means that deteriorates over time due to the environment in which said apparatus is used being less than or equal to the deterioration-resisting power of said lens unit, said deterioration indicator means having a deterioration property that can be measured and whose measured value represents the degree of deterioration of said deterioration indicator means, and said deterioration indicator means being arranged so as not to participate in any functions of said apparatus during use of said apparatus.

7. An apparatus comprising:

a recoverable and reusable unit performing a function independent of determining the degree of deterioration of said recoverable and reusable unit, which is recoverable and reusable after use of said unit and said apparatus in the environment, depending on the degree of deterioration of said unit due to the environment; and a deterioration indicator member disposed inside said apparatus, the deterioration-resisting power of said deterioration indicator member that deteriorates over time due to the environment in which said apparatus is used being less than or equal to the deterioration-resisting power of said recoverable and reusable unit, said deterioration indicator member being arranged so as not to participate in any functions of said apparatus during use of said apparatus, said deterioration indicator member determining the degree of deterioration of said recoverable and reusable unit before said unit is reconditioned for reuse by permitting a determination of the degree of deterioration thereof, wherein said unit is a lens unit.

8. An apparatus comprising:

a recoverable and reusable unit performing a function independent of determining the degree of deterioration of said recoverable and resuable unit, which is recoverable and reusable after use; and a deterioration indicator member disposed inside said apparatus to determine the degree of deterioration of said recoverable and resuable unit, the deterioration-resisting power of said deterioration indicator member that deteriorates over time due to the environment in which said apparatus is used being less than or equal to the deterioration-resisting power of said recoverable and reusable unit, and said deterioration indicator member being arranged so as not to participate in any functions of said apparatus during use of said apparatus, and wherein the degree of deterioration of said deterioration indicator member is determined by using an inspection device to inspect said deterioration indicator member, so that said deterioration indicator member comprises means for providing a value of the deterioration of said deterioration indicator member in response to inspection by the inspection device before the unit is reconditioned for reuse, wherein said unit is a lens unit.

9. An apparatus including a unit which is recoverable and reusable after use, said apparatus comprising:

an environmental history indicator member disposed inside said apparatus, said environmental history indicator member having a property variable according to an environmental history of use of said apparatus and being arranged so as not to participate in any functions of said apparatus during use of said apparatus, wherein said unit is a lens unit, and said environmental history indicator member has a property which varies according to an environmental history with respect to temperature and/or humidity, wherein said environmental history indicator member is an optical filter having a light transmitting property which varies according to an environmental history with respect to temperature and/or humidity.

10. An apparatus according to claim 3 or 9, wherein said apparatus is an image reading apparatus, a photo printer, or a video camera.

11. An apparatus according to claim 9, wherein said optical filter as said environmental history indicator member is composed of an ND filter, copper phosphate glass, gelatin or optical glass having a refractive index of substantially 1.6 to 1.65 and an Abbe number of substantially 60.

12. An optical apparatus comprising:

a lens unit which is recoverable and resuable after use; and a deterioration indicator member disposed inside said apparatus, the deterioration-resisting power of said deterioration indicator member that deteriorates over time due to the environment in which said apparatus is used being less than or equal to the deterioration-resisting power of said lens unit, wherein the service life of said lens unit is affected by an environmental factor, wherein the environmental factor causes said deterioration indicator member, and said lens unit to deteriorate, and wherein said deterioration indicator member maintains its state of deterioration even if it is dismounted from said optical apparatus.

13. An optical apparatus comprising:

a unit which is recoverable and resuable after use; and a deterioration indicator member disposed inside said apparatus, the deterioration-resisting power of said deterioration indicator member that deteriorates over time due to the environment in which said apparatus is used being less than or equal to the deterioration-resisting power of said unit, wherein the service life of said unit is affected by an environmental factor, wherein the environmental factor causes said deterioration indicator member and unit to deteriorate, wherein said deterioration indicator member maintains its state of deterioration even if it is dismounted from said optical apparatus, and wherein said optical apparatus is an image reading apparatus, photo printer or a video camera.

* * * * *

UNITED STATES PATENT AND TRADEMARK OFFICE
CERTIFICATE OF CORRECTION

| | | |
|---|---|---|
| PATENT NO. | : 6,951,186 B2 | Page 1 of 1 |
| APPLICATION NO. | : 09/774626 | |
| DATED | : October 4, 2005 | |
| INVENTOR(S) | : Motomu Fukasawa | |

It is certified that error appears in the above-identified patent and that said Letters Patent is hereby corrected as shown below:

ON THE TITLE PAGE
Item (56), References Cited, FOREIGN PATENT DOCUMENTS, "63122780" should read --63-122780--; and "01174920" should read --01-174920--.

COLUMN 1
Line 51, "be not" should read --not be--.

COLUMN 4
Line 22, "material" should read --material,--.
Line 23, "reuse" should read --reuse,--.

Signed and Sealed this

Fourth Day of July, 2006

JON W. DUDAS
*Director of the United States Patent and Trademark Office*